United States Patent Office 2,911,294
Patented Nov. 3, 1959

2,911,294

1,3-TETRAHYDRO OXAZINE AS A HERBICIDE

Jamal S. Eden, Bath, Ohio, assignor to Diamond Alkali Company, Cleveland, Ohio, a corporation of Delaware No Drawing. Application September 9, 1957
Serial No. 682,604

1 Claim. (Cl. 71—2.5)

This invention relates to novel compounds having the structure

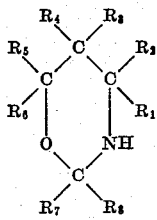

wherein $R_1$, $R_2$, $R_3$, $R_4$, $R_5$, $R_6$, $R_7$ and $R_8$ are selected from the group consisting of hydrogen and alkyl radicals, especially lower alkyl radicals, such as methyl, ethyl, propyl, butyl, and the like.

This invention also relates to the general method of preparing the above compounds comprising the reaction of a 3-hydroxy-primary amine with a carbonyl compound, e.g., an aldehyde or ketone, an aldehyde being preferred, also preferably using a water-immiscible solvent, typically benzene.

Illustrative of suitable carbonyl compounds are paraformaldehyde, which is preferred, formaldehyde, acetaldehyde, propionaldehyde, and the like. Exemplary aminoalkanols include 1,3-aminopropanol, which is presently preferred, 1,3-aminobutanol, 1,3-aminopentanol, and the like.

While compounds of this invention may be employed in a variety of applications, biologically active or otherwise, including use as chemical intermediate for further synthesis, when employed as biologically active materials, it will be understood, of course, that such compounds may be utilized in diverse formulations, both liquid and solid, including finely-divided powders and granular materials as well as liquids, such as solutions, concentrates, emulsifiable concentrates, slurries, and the like, depending upon the application intended and the formulation media desired.

Thus, it will be appreciated that compounds of this invention may be employed to form biologically active substances containing such compounds as essential active ingredients thereof, which compositions may also include finely-divided dry or liquid diluents, extenders, fillers, conditioners, including various clays, diatomaceous earth, talc, spent catalyst, alumina silica materials and incorporating liquid solvents, diluents, etc., typically, water and various organic liquids such as kerosene, acetone, benzene, toluene, xylene, and other petroleum distillate fractions or mixtures thereof.

When liquid formulations are employed, or dry materials prepared which are to be used in liquid form, it is desirable in certain instances additionally to employ a wetting, emulsifying or dispersing agent to facilitate use of the formulation, e.g., Triton X-155 (alkyl aryl polyether alcohol, U.S. 2,504,064).

The term "carrier" as employed in the specification and claims is intended to refer broadly to the material constituting a major proportion of a biologically active or other formulation and hence includes finely-divided materials, both liquids and solids, as aforementioned, conventionally used in such applications.

In order that those skilled in the art may more completely understand the present invention and the preferred methods by which the same may be carried into effect, the following specific examples are offered:

EXAMPLE I

Part A

PREPARATION OF TETRAHYDRO-1,3-OXAZINE

A mixture of 225 gm. (3.0 mol) of 1,3-aminopropanol, 90 gm. (3.0 mol) of paraformaldehyde and 400 cc. of benzene is refluxed for four hours while 56 cc. of water is separated in a Dean-Stark tube. The benzene is then removed by distillation at atmospheric pressure. The reaction product is vacuum-distilled at 65°–75° C. at 6–7 mm. mercury pressure to give a colorless liquid which weighs 201 grams equaling 74% yield. The reaction product is soluble in water, acetone and xylene. The following elemental analysis indicates the compound obtained is the desired $C_4H_9NO$:

| Element | Actual Percent by Wt. | Calculated Percent by Wt. |
|---|---|---|
| N | 16.04 | 16.07 |

Part B

To illustrate the utility of tetrahydro-1,3-oxazine, the following test is carried out:

250 mg. of the product from Part A is applied to the soil around tomato, bean, and corn plants growing in 4" clay pots. It is observed that both the corn and tomato plants are killed and the bean plants are wilted, thus indicating a high degree of herbicidal action.

Part C

Fungus spore germination tests on glass slides are conducted by the test tube dilution method adopted from the procedure recommended by the American Phytopathological Society's committee on standardization of fungicidal tests. In this procedure, the product of Part A of this example in aqueous formulation at concentrations of 1000, 100, 10, and 1.0 p.p.m. is tested for its ability to inhibit germination of spores from 7 to 10-day-old cultures of *Alternaria oleacea* and *Monilinia fructicola*.

Germination records are taken after 20 hours of incubation at 20° C. by counting 100 spores. The test compound inhibits germination of half the spores (E.D. 50 value) at concentrations of 100–1000 p.p.m. for the *A. oleracea* and 10–100 p.p.m. for the *M. fructicola* thus indicating fungicidal activity.

It is to be understood that although the invention has been described with specific reference to particular embodiments thereof, it is not to be so limited since changes and alterations therein may be made which are in the full intended scope of this invention as defined by the appended claim.

What is claimed is:

The method of killing plants which comprises applying to the plant a herbicidal amount of a tetrahydro-1,3-oxazine having the structure
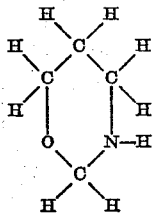
References Cited in the file of this patent
Kohn et al.: Chem. Abs., vol. 1, p. 2564 (1908).
Mannick et al.: Chem. Abs., vol. 26, pp. 2966–67 (1932).
Mannick et al.: Chem. Abstracts, vol. 31, p. 2216 (1937).